US012623103B2

(12) United States Patent
Shin

(10) Patent No.: US 12,623,103 B2
(45) Date of Patent: May 12, 2026

(54) FIRE EXTINGUISHING SYSTEM FOR A VEHICLE

(71) Applicants: HYUNDAI MOTOR COMPANY, Seoul (KR); KIA CORPORATION, Seoul (KR)

(72) Inventor: Hyeon Gi Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 634 days.

(21) Appl. No.: 18/085,251

(22) Filed: Dec. 20, 2022

(65) Prior Publication Data

US 2024/0082610 A1     Mar. 14, 2024

(30) Foreign Application Priority Data

Sep. 14, 2022    (KR) ........................ 10-2022-0115758

(51) Int. Cl.
| | |
|---|---|
| *A62C 3/07* | (2006.01) |
| *A62C 3/16* | (2006.01) |
| *A62C 37/40* | (2006.01) |
| *H01M 8/04029* | (2016.01) |
| *H01M 8/04119* | (2016.01) |

(52) U.S. Cl.
CPC ................. *A62C 3/07* (2013.01); *A62C 3/16* (2013.01); *A62C 37/40* (2013.01); *H01M 8/04029* (2013.01); *H01M 8/04156* (2013.01); *H01M 2250/20* (2013.01)

(58) Field of Classification Search
CPC .......... A62C 3/08; A62C 3/16; A62C 3/07–10
USPC ........................................................ 169/13
See application file for complete search history.

(56) References Cited

U.S. PATENT DOCUMENTS

| | | | | |
|---|---|---|---|---|
| 6,761,226 | B2 * | 7/2004 | Carrier ................... | A62C 27/00 169/25 |
| 9,829,895 | B2 * | 11/2017 | McLoughlin ........... | F04B 17/06 |
| 10,343,003 | B2 * | 7/2019 | Baker ..................... | A62C 35/02 |
| 10,507,345 | B2 * | 12/2019 | Klassen ............. | A62C 99/0018 |
| 10,828,518 | B2 * | 11/2020 | Ribarov ................. | A62C 5/008 |
| 11,909,018 | B2 * | 2/2024 | Guo .................... | H01M 50/249 |

(Continued)

FOREIGN PATENT DOCUMENTS

WO    WO-2015075679 A1 *   5/2015   ............. B60R 15/00

*Primary Examiner* — Arthur O. Hall
*Assistant Examiner* — Andrew Domenic Ondrejcak
(74) *Attorney, Agent, or Firm* — Lempia Summerfield Katz LLC

(57)          ABSTRACT

A fire extinguishing system for a vehicle includes: a first water tank in which fuel cell exhaust water from a fuel cell stack of a fuel cell system is stored; a first pump for pumping the fuel cell exhaust water; a coolant pump for pumping coolants of a water cooling system provided in the vehicle; a turbulence generator provided to pass through the fuel cell exhaust water pumped by the first pump and the coolants pumped by the coolant pump, and configured to generate a turbulent flow of the fuel cell exhaust water and coolants passing therethrough; and a battery fire suppression nozzle provided in a battery pack mounted on the vehicle. The nozzle is supplied with a fire extinguishing water, which is a mixture of fluids passing through the turbulence generator and is configured to supply the fire extinguishing water to the inside of the battery pack.

19 Claims, 10 Drawing Sheets

(56) References Cited

U.S. PATENT DOCUMENTS

| | | | |
|---|---|---|---|
| 2010/0297513 A1* | 11/2010 | Yasuda | H01M 8/04164 |
| | | | 429/423 |
| 2013/0025888 A1* | 1/2013 | Eckholm | A62C 3/16 |
| | | | 169/61 |
| 2017/0014655 A1* | 1/2017 | Gatsonides | B64D 45/00 |
| 2021/0154503 A1* | 5/2021 | Ginder | A62C 3/16 |
| 2023/0170552 A1* | 6/2023 | Baeder | H01M 10/6568 |
| | | | 429/50 |
| 2024/0009498 A1* | 1/2024 | Schweitzer | A62C 37/40 |

* cited by examiner controller — 160 current value : A1
resistance value : R1

150

153

152

151 controller — 160 current value : A2 (A2<A1)
resistance value : R2 (R2>R1)

150

153

152

151

FIRE EXTINGUISHING SYSTEM FOR A VEHICLE

CROSS REFERENCE TO RELATED APPLICATION

The present application claims priority to Korean Patent Application No. 10-2022-0115758, filed Sep. 14, 2022, the entire contents of which are incorporated herein for all purposes by this reference.

BACKGROUND

Technical Field

The present disclosure relates to a fire extinguishing system for a vehicle and, more particularly, the system is capable of automatically and quickly suppressing a fire occurring in a battery or in or at the tires of a vehicle.

Description of the Related Art

In general, there is a risk of fire in a vehicle since a number of heat sources exist in a vehicle and since various electrical wires are provided in a tangled manner. In addition to parts related to electricity, a fire may also occur in or at the tires of vehicles that generate heat due to friction.

Recently, as the use of eco-friendly vehicles such as electric vehicles and fuel cell vehicles increases, the risk of fire due to external impact or internal short circuits in batteries or high-voltage electrical wiring is increasing.

Eco-friendly vehicles run by driving a motor with electric power charged in a battery and may be all considered as electric vehicles in a broad sense. Such an electric vehicle is equipped with a high-voltage battery pack that supplies power to a motor. The high-voltage battery pack supplies power to electronic systems in the vehicle, such as a motor, while repeatedly charging and discharging as the vehicle is driving.

A battery pack of an electric vehicle typically has a battery casing, a battery module disposed inside the battery casing, and a battery management system (BMS). The BMS detects voltage, electric current, temperature of cells composing the battery module, and controls an operation of the cells. In addition, the battery pack is configured to prevent fire by blowing a fuse or cutting off a relay connected to an inverter when an internal circuit experiences an overcurrent flow.

However, in an electric vehicle, a fire may occur inside the battery pack while driving due to various causes such as a collision or malfunction of parts. If the fire in the battery pack is not properly extinguished, it may lead to burnout of the vehicle, resulting in significant damage to the vehicle and potential loss of life.

A fire in a battery may spread in a short amount of time due to internal and external structures and materials in the battery. In the case of public transportation vehicles such as buses, a large number of passengers are on board. Therefor rapid response to a fire for passenger safety is essential, and failure of initial response may lead to a major disaster.

Nevertheless, the provision of a fire extinguisher provided and used in a vehicle as a method to respond to a fire is widely known. Even in this case, if a driver fails to use the fire extinguisher in a timely manner, an initial fire response may fail and the fire may spread throughout the vehicle, increasing a risk of personal injury. Even if the driver or passenger inside of the vehicle quickly recognizes an occurrence of a fire, extinguishing the fire with only a small fire extinguisher provided in the vehicle is difficult.

If a fire hydrant is located near the vehicle or a fire engine is located near the fire site, the fire may be extinguished by spraying water on the vehicle.

In addition, there is a need for a countermeasure in case a reignition or a thermal runaway occurs in the battery pack after a first fire is extinguished.

SUMMARY

Accordingly, the present disclosure has been made to solve the above concerns. An objective of the present disclosure is to provide a fire extinguishing system for a vehicle. Specifically, the system is capable of automatically and quickly suppressing a fire occurring in a vehicle battery or in or at the tires.

In particular, an objective of the present disclosure is to provide a fire extinguishing system for a vehicle. The system is capable of suppressing a fire occurring in a battery or tires using fuel cell exhaust water in a fuel cell vehicle.

In order to achieve the above objectives, a fire extinguishing system is provided according to an embodiment of the present disclosure. The fire extinguishing system includes a first water tank in which the fuel cell exhaust water generated and discharged from a fuel cell stack of a fuel cell system mounted on a vehicle is stored, a first pump for pumping the fuel cell exhaust water stored in the first water tank, and a coolant pump for pumping coolants of a water cooling system provided in the vehicle. The system also includes a turbulence generator provided to allow the fuel cell exhaust water pumped by the first pump and the coolants pumped by the coolant pump to pass therethrough and to generate a turbulent flow of the fuel cell exhaust water and coolants so that fluids are mixed. Additionally, the system includes a battery fire suppression nozzle provided in a battery pack mounted on the vehicle and being supplied with fire extinguishing water, which is a mixture of the fluids passing through the turbulence generator, and supplying the fire extinguishing water to the inside of the battery pack.

According to the fire extinguishing system for a vehicle of the present disclosure, fires of batteries or tires may be automatically and quickly suppressed using fuel cell exhaust water. The fuel cell exhaust water may be supplied and used for necessary purposes such as car washing, cleaning, and other cleaning purposes.

In addition, a fire suppression performance is further increased by selectively supplying coolants, containing a main component of an extinguishing fluid, so that the coolants may be used in a mixed state with the fuel cell exhaust water. The coolants may be a battery coolant, a power electronic system coolant, and a fuel cell stack coolant according to a priority.

DETAILED DESCRIPTION

Figure 1:
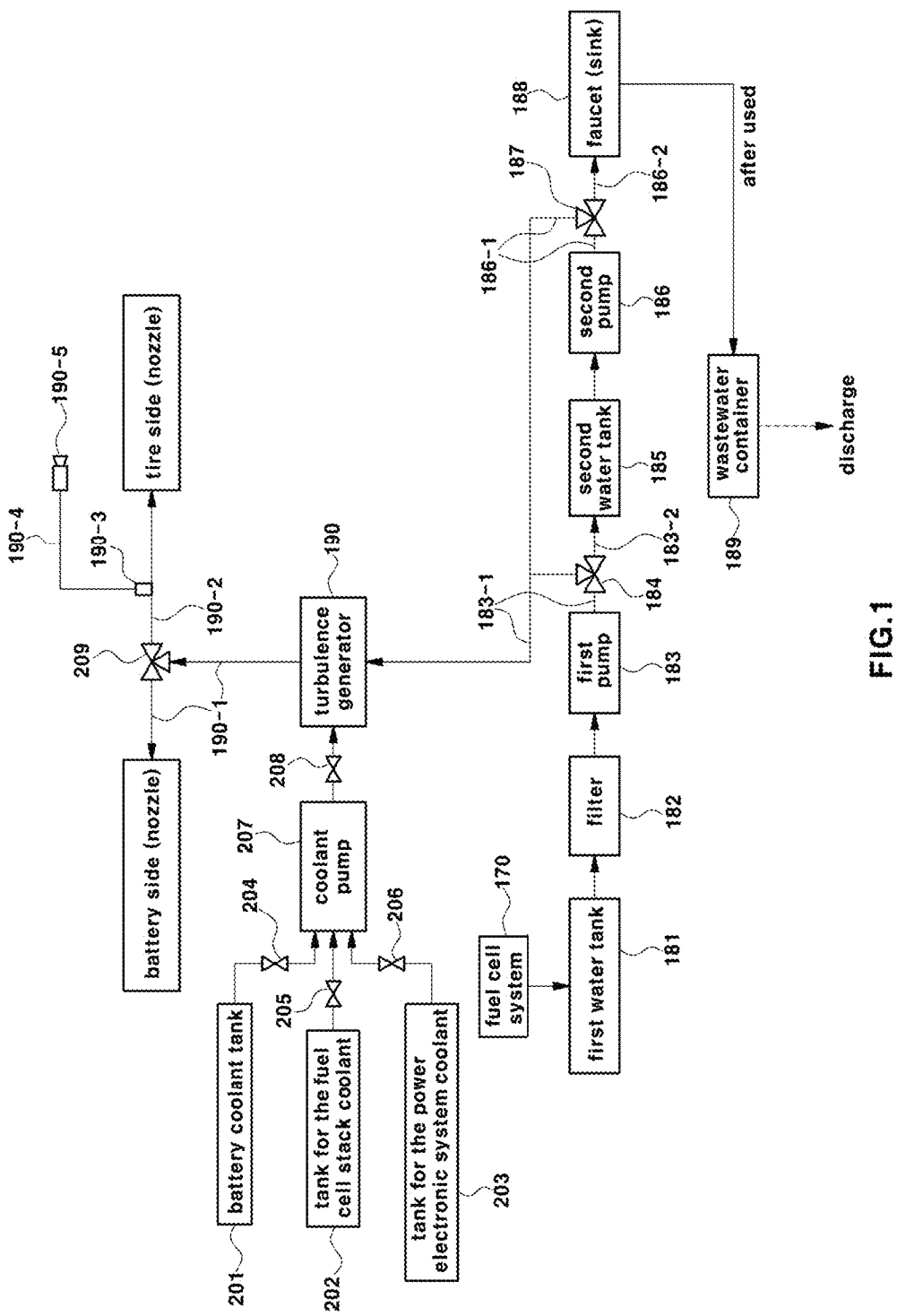
FIG. 1 is a block diagram showing an overall configuration of a fire extinguishing system according to an embodiment of the present disclosure.

Hereinafter, embodiments of the present disclosure are described in detail with reference to the accompanying drawings. Specific structural or functional descriptions presented in the embodiments of the present disclosure are only exemplified for the purpose of describing embodiments according to the concept of the present disclosure. The embodiments according to the concept of the present disclosure may be implemented in various forms. In addition, the present disclosure should not be construed as being limited to the embodiments described herein, and should be understood to include all modifications, equivalents, and substitutes included in the spirit and scope of the present disclosure.

In the present disclosure, terms such as first and/or second may be used to describe various components, but the components are not limited by such terms. The terms are used only for the purpose of distinguishing one component from other components, such as for example, within the scope of rights according to the concept of the present disclosure, the first component may be named as the second component. Similarly, the second component may also be named as the first component.

When a component is referred to as being "connected to" or "in contact with" another component, it should be understood that it may be directly connected to or contacting the other component, but other components may exist in between. On the other hand, when it is mentioned that a certain element is "directly connected" or "directly in contact" with another element, it should be understood that no other element is present in between. Other expressions for describing the relationship between elements, i.e., expressions such as "between" and "immediately between" or "adjacent to" and "directly adjacent to" should be interpreted similarly.

Like reference numbers refer to like elements throughout. On the other hand, the terms used herein are for the purpose of describing the embodiments and are not intended to limit the present disclosure. In this description, the singular form also includes the plural form unless otherwise specified in the phrase. As used herein, "comprises" and/or "comprising," as well as "have," "include," and variations thereof, mean that a referenced component, step, operation and/or element is the presence of one or more other components, steps, operations and/or elements, or addition is not excluded. When a component, device, element, or the like of the present disclosure is described as having a purpose or performing an operation, function, or the like, the component, device, or element should be considered herein as being "configured to" meet that purpose or perform that operation or function.

The present disclosure relates to a fire extinguishing system for a vehicle. The system is capable of automatically and quickly suppressing a fire occurring in a battery or in or at tires in a fuel cell vehicle. More particularly, the present disclosure relates to a fire extinguishing system for a vehicle capable of suppressing a fire in the battery or tires using fuel cell exhaust water generated by an electrochemical reaction in a fuel cell stack of a vehicle and discharged therefrom.

In general, a fuel cell system mounted on a fuel cell vehicle is a kind of power generation system that directly converts chemical energy of fuel into electrical energy. The fuel cell system largely includes the fuel cell stack that is supplied fuel and an oxidizer and generates electric energy through an electrochemical reaction, a fuel supply device that supplies fuel (hydrogen) to the fuel cell stack, and an air supply device that supplies air containing oxygen. The air containing oxygen is an oxidizing agent required for the electrochemical reaction to the fuel cell stack. The fuel cell system also includes a heat and water management system for removing heat, which is generated from the reaction of the fuel cell stack, out of the system and controlling an operating temperature of the fuel cell stack.

In such a fuel cell system, electric energy is generated through the electrochemical reaction between hydrogen as a fuel and oxygen in the air as an oxidizing agent. Heat and water are discharged as reaction byproducts. As described above, since the fuel cell system generates heat as a reaction byproduct, a cooling system for cooling the fuel cell stack is essentially used in order to prevent a temperature increase of the fuel cell stack.

Figure 2:
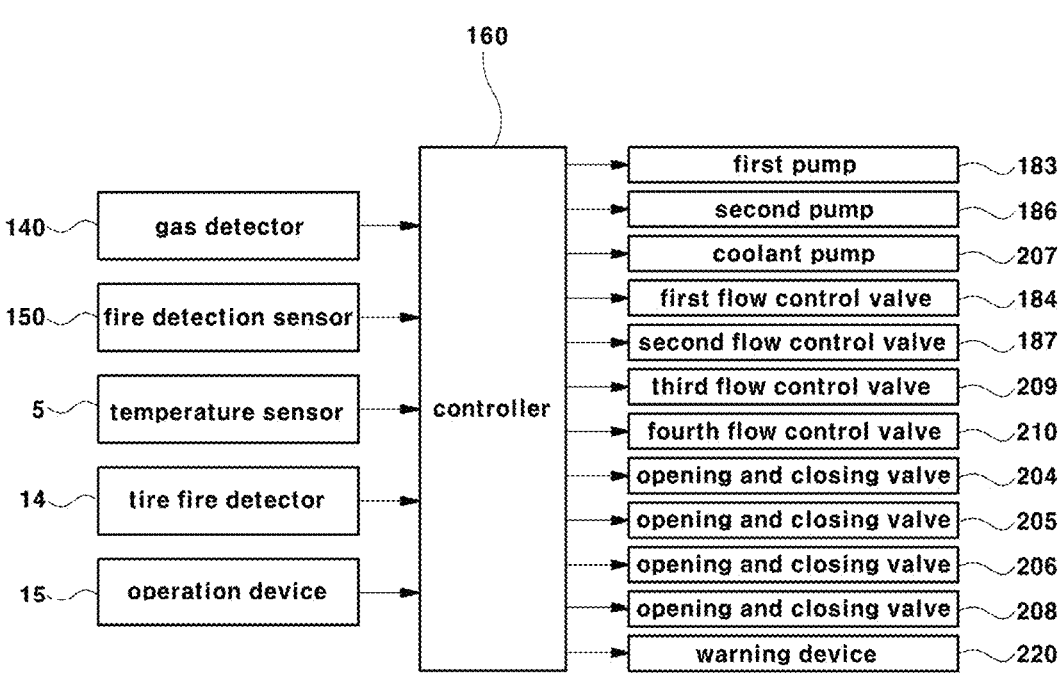
FIG. 2 is a block diagram showing main components of the fire extinguishing system according to an embodiment of the present disclosure including a configuration of input elements, a controller, and operating elements.

FIG. 1 is a block diagram showing an overall configuration of the fire extinguishing system according to an embodiment of the present disclosure. FIG. 2 is a block diagram showing main components of the fire extinguishing system according to an embodiment of the present disclosure. Such main components may include input elements, a controller 160, and a configuration of operating elements.

The present disclosure is configured to store the fuel cell exhaust water that is generated and discharged by the electrochemical reaction of the fuel cell in a water tank. The fuel cell exhaust water is then used as fire extinguishing water.

To this end, the fire extinguishing system according to an embodiment of the present disclosure includes a first water tank 181 in which the water generated and discharged from the fuel cell stack (fuel cell generated water) during the operation of a fuel cell system 170, i.e., the fuel cell exhaust water, is stored. The first water tank 181 is connected to a drain through which the fuel cell exhaust water is discharged from the fuel cell system 170 through a pipe such as a hose in the vehicle.

In addition, the fire extinguish system according to an embodiment of the present disclosure further includes a first pump 183 provided in an outlet pipe of the first water tank 181 in which the fuel cell exhaust water is stored. The system also includes, in a pipe between the first water tank 181 and the first pump 183, a filter 182 removing impurities in the fuel cell exhaust water pumped by the first pump 183 from the first water tank 181 may be provided.

In addition, the fire extinguishing system according to an embodiment of the present disclosure may further include a second water tank 185 in which water supplied from outside of the vehicle is stored. The second pump 186 is provided in an outlet pipe of the second water tank 185.

In an embodiment of the present disclosure, an outlet pipe 183-1 of the first pump 183 is connected to a fuel cell exhaust water inlet port (reference numeral 191 in FIG. 11) of a turbulence generator 190. At this time, the first branch pipe 183-2 is branched and connected to the outlet pipe 183-1 of the first pump 183. The first branch pipe 183-2, branched from the outlet pipe 183-1 of the first pump 183, is connected to the second water tank 185.

At this time, at a branch point where the first branch pipe 183-2 is branched from the outlet pipe 183-1 of the first pump 183, the first flow control valve 184 is provided. The first flow control valve 184 is configured to control a flow direction of the fuel cell exhaust water pumped by the first pump 183 according to a control signal output from the controller 160.

The first flow control valve 184 allows a coolant pumped by the first pump 183 to flow in any one direction of the outlet pipe 183-1 of the first pump connected to the turbulence generator 190 and the first branch pipe 183-2 connected to the second water tank 185, according to an opening state thereof.

In other words, when the first pump 183 is operating, the fuel cell exhaust water stored in the first water tank 181 may be pumped through the outlet pipe 183-1 of the first pump and be supplied to the turbulence generator 190 or may be pumped through the first branch pipe 183-2 and supplied to the second water tank 185, according to the opening state of the first flow control valve 184.

The first flow control valve 184 may be a three-way valve provided at a branch point but may have a configuration including a valve provided in the outlet pipe 183-1 of the first pump 183 connected to the turbulence generator 190, and a valve provided in the first branch pipe 183-2. In this case, both valves are electronic valves where the opening and closing operation thereof is controlled by a control signal of the controller 160.

In addition, an outlet pipe 186-1 of the second pump 186 is connected to an inlet pipe of the turbulence generator 190. In other words, among the outlet pipe 183-1 of the first pump 183 that is connected to the turbulence generator 190, the outlet pipe 186-1 is connected to a downstream (rear end) position of the first flow control valve 184.

At this time, the second branch pipe 186-2 may be branched and connected to the outlet pipe 186-1 of the second pump 186. The second branch pipe 186-2 is connected to a water faucet 188 of a place requiring water, such as a washbasin in the vehicle. A drain port of a washbasin in which the water faucet 188 is provided may be connected to a wastewater container 189 in which water used in the washbasin is stored through a pipe.

In addition, at a branch point where the second branch pipe 186-2 is branched from the outlet pipe 186-1 of the second pump 186, the second flow control valve 187 is provided. The second flow control valve 187 controls a flow direction of water pumped by the second pump 186 according to a control signal output from the controller 160.

The second flow control valve 187 allows water pumped from the second water tank 185 by the second pump 186, according to the opening state thereof, to flow in any one of the outlet pipes 186-1 of the second pump 186 and the second branch pipe 186-2.

In other words, when the second pump 186 is operating, depending on the opening state of the second flow control valve 187, water stored in the second water tank 185 is pumped through the outlet pipe 186-1 of the second pump 186 and supplied to the turbulence generator 190. Alternatively, the water stored in the second water tank 185 may also be pumped through the second branch pipe 186-2 and supplied to the water faucet 188, such as a washbasin.

The second flow control valve 187 may be a three-way valve provided at a branch point but may have a configuration including a valve provided in the outlet pipe 186-1 of the second pump 186 and a valve provided in the second branch pipe 186-2. In this case, both valves are electronic valves where the opening and closing operation thereof is controlled by a control signal of the controller 160.

The present disclosure is configured to use the fuel cell exhaust water generated by the electrochemical reaction of the fuel cell and discharged as fire extinguishing water, after storing the fuel cell exhaust water in the first water tank 181.

Assuming that the fuel cell vehicle travels 100 km per day and 65 liters of water is generated and discharged from the fuel cell stack while driving 100 km, then it may be possible to collect and store the 65 liters of fuel cell discharge water in the first water tank 181 and to be used as fire extinguishing water.

Additionally, the present disclosure is configured to use water supplied to the vehicle through an external water supply device, such as a water supply facility, and then use the stored water in the second water tank 185 as fire extinguishing water.

In addition, in a more urgent emergency situation, the present disclosure is configured to further use coolants of a water-cooling system of the vehicle selectively in addition to the fire extinguishing water stored in tanks 181 and 185. In other words, the coolants for cooling in-vehicle devices may be used as the fire extinguishing water for fire suppression.

The in-vehicle devices are devices that are cooled by water cooling in the vehicle. Such in-vehicle devices may be the fuel cell stack, the battery, a Power Electronic (PE) system including a motor and an inverter, an Auto Transmission (ATM), and the like.

In other words, a coolant for the fuel cell stack, a coolant for the battery, a coolant for the power electronic system (PE) including the motor and the inverter, a coolant for a transmission, and the like, may be selectively used as the fire extinguishing water for extinguishing fires occurring in vehicles.

To this end, the fire extinguishing system according to an embodiment of the present disclosure may further include coolant tanks 201, 202, and 203, in which coolants are stored. The fire extinguishing system may also include a coolant pump 207 for supplying the coolants stored in the coolant tanks to the turbulence generator 190.

Referring to FIG. 1, the tanks of coolants may include: a tank for the battery coolant 201 in which a coolant for the battery is stored; a tank for the fuel cell stack coolant 202 in which a coolant for the fuel cell stack is stored; and a tank for the power electronic system coolant 203 in which a coolant for the power electronic system and the transmission is stored.

At this time, the outlet pipes of each coolant water tank 201, 202, and 203 may be combined into one pipe, and the coolant pump 207 may be provided in the combined one pipe. In addition, opening and closing valves 204, 205, and 206 are configured to control an opening and closing operation, according to a control signal output by the controller 160, and may be provided in the outlet pipe of each coolant tank 201, 202, and 203.

In addition, the outlet pipe of the coolant pump 207 is connected to a coolant inlet port (reference numeral 192 in FIG. 11) of the turbulence generator 190. Additionally, a separate opening and closing valve 208 is configured to control an opening and closing operation, according to a control signal output from the controller 160 and may be provided in the outlet pipe of the coolant pump 207.

Figure 4:
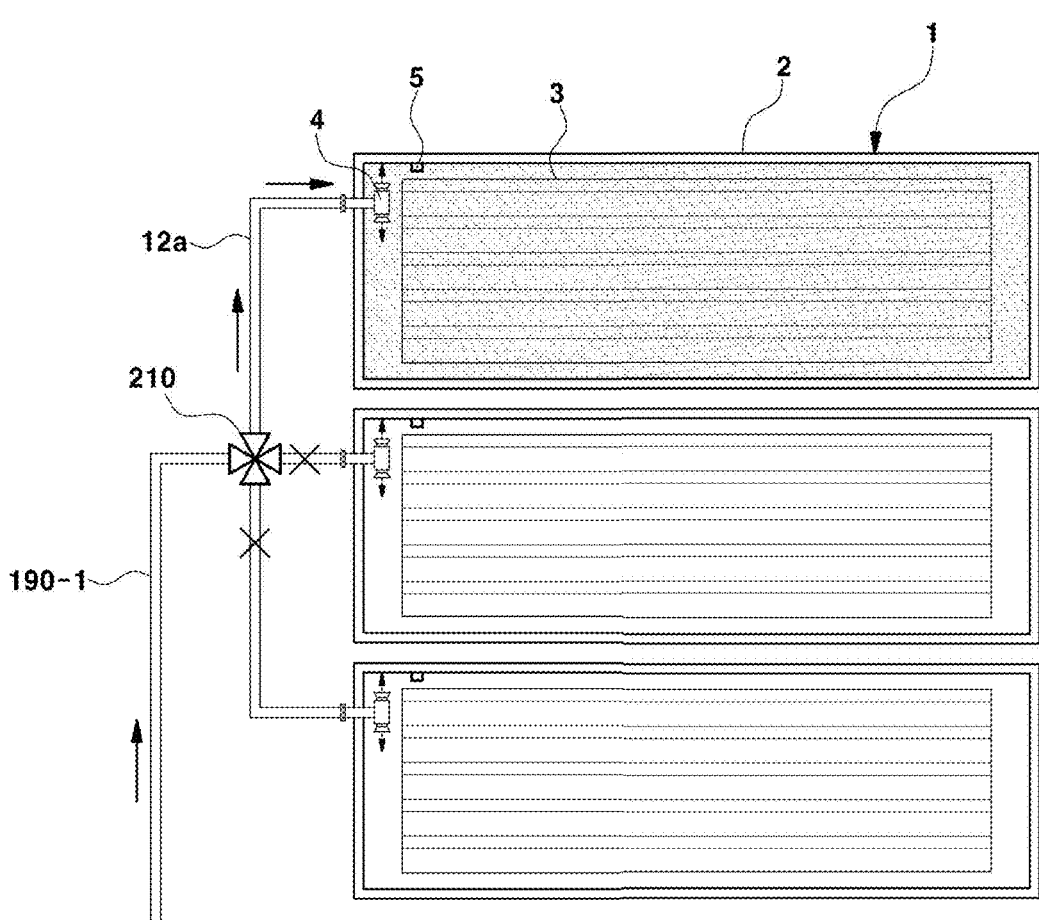
FIG. 4 is a view showing a battery pack of a vehicle to which a fire extinguishing system according to an embodiment of the present disclosure is applied and showing a nozzle and a temperature sensor provided inside the battery pack.

In addition, the pipe connected to an outlet port (reference numeral 194 in FIG. 11) of the turbulence generator 190, i.e., the outlet pipe 190-1 of the turbulence generator 190, is connected to the battery fire suppression nozzle (reference numeral 4 in FIG. 4). Accordingly, the fire extinguishing water, which passes through the turbulence generator 190, may be supplied to the inside of the battery pack 1 through the battery fire suppression nozzle 4. Further, the fire extinguishing water supplied to the inside of the battery pack 1, may suppress a fire occurring in the battery cell 3.

The battery fire suppression nozzle 4 may be provided inside of the battery pack 1. Additionally, the battery pack 1, to which the fire extinguishing system of the present disclosure is applied, is provided in a closed structure so that the fire extinguishing water may be filled therein. In addition, a separate third branch pipe 190-2 may branch from the outlet pipe 190-1 of the turbulence generator 190. The third branch pipe 190-2 may be connected to a tire fire suppression nozzle of a plurality of tire fire suppression nozzles (reference numeral 13 in FIG. 3).

At this time, at the branch point where the third branch pipe 190-2 is branched from the outlet pipe 190-1 of the turbulence generator 190, the third flow control valve 209 is provided. The third flow control valve 209 controls a direction of the fire extinguishing water that passes through the turbulence generator 190 according to the control signal output from the controller 160.

Figure 3:
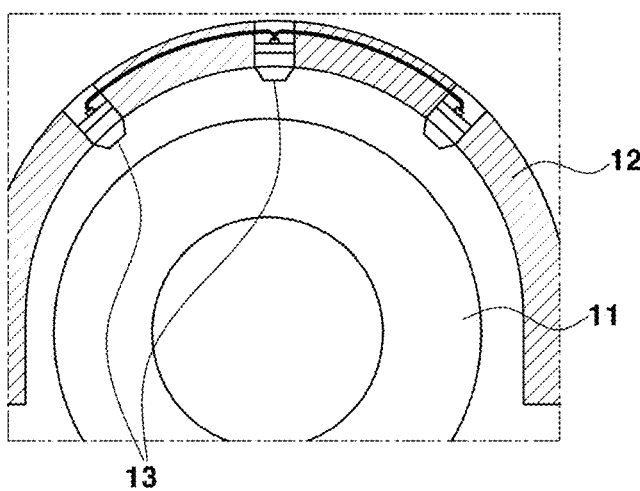
FIG. 3 is a view showing a state in which a nozzle is provided on a tire side of a vehicle in the fire extinguishing system according to an embodiment of the present disclosure.

FIG. 3 is a view showing a state in which a nozzle 13 (a nozzle for suppressing a tire fire) of a plurality of nozzles is provided on a tire side of a vehicle in an embodiment of the present disclosure. As shown, the nozzle for the tire fire suppression 13 is provided at a position where the fire extinguishing water can be sprayed toward a tire 11.

In addition, as shown, a plurality of nozzles for tire fire suppression 13 are provided in a vehicle body under the vehicle, for example, in a wheel well 12. The wheel well 12 is the body part above the tire 11. Furthermore, the plurality of nozzles for tire fire suppression 13 are provided at predetermined intervals in the front-rear direction along the tire 11.

In addition, a temperature sensor may be used as a tire fire detector 14 for detecting the occurrence of fire on or at a tire side and may be provided in a part of the vehicle body around the tire 11. The controller 160 may determine that fire has occurred on the tire side when a temperature detected by the temperature sensor, i.e., the tire fire detector 14, exceeds a set temperature. The temperature sensor may be a temperature sensor of a tire pressure monitoring system (TPMS).

The third flow control valve 209 may be a three-way valve, and the fire extinguishing water passing through the turbulence generator 190, according to an opening state of the third flow control valve 209, may be supplied to a nozzle to the inside of the battery pack (the battery fire suppression nozzle 4) or a tire-side nozzle (the nozzle for tire fire suppression) 13.

In this way, the water stored in the water tank (the fuel cell exhaust water and water supplied from outside) or the coolants of the water cooling system are supplied to the tire fire suppression nozzles 13 to suppress the fire of the tire 11 as well as the battery fire suppression nozzle 4 to suppress the battery fire.

At this time, in the turbulence generator 190, the water (the fuel cell exhaust water and the water supplied from outside) supplied from the water tanks 181 and 185, and the coolants supplied from the coolant tanks 201, 202, and 203 of the water cooling system are evenly mixed. The mixed fire extinguishing water is supplied to the nozzle (reference numeral 4 in FIG. 4) for the battery fire suppression nozzle 4 or the tire fire suppression nozzles 13, according to an opening state for the third flow control valve 209.

In addition, the fire extinguishing system according to an embodiment of the present disclosure further includes an operation device 15 such as a button, a switch, or a handle to be operated by a user (or a driver). When the user operates the operation device 15, an electrical signal according to the operation of the operation device is input to the controller 160.

The operation device 15 may be provided near each tire, and even when the fire in the tire 11 is detected by the temperature sensor, which is the tire fire detector 14, the controller 160 performs control for extinguishing the tire fire only when the driver operates the operation device, i.e., only when a signal is input from the operation device 15 according to the operation.

The fire extinguishing system, according to an embodiment of the present disclosure, may detect and suppress fire for a plurality of tires 11 having different positions in a vehicle. To this end, the third branch pipe 190-2 is branched and connected to the tire fire suppression nozzles 13 provided on each tire side, and valves, in which the opening and closing operation is controlled by the controller 160, may be provided in each branched and connected pipe.

In addition, a hose connection port 190-3 is formed in the third branch pipe 190-2 branched from the outlet pipe 190-1 of the turbulence generator 190. The hose connection port 190-3 may be provided so that a coupler provided at one end of the hose 190-4 is connected in a screw-fastening manner. At this time, a nozzle 190-5 may be provided at the other end opposite to the hose.

A stopper (not shown) may be detachably coupled to the hose connection port 190-3 to block an internal passage, and in an ordinary day (e.g., a day without a fire occurring), the stopper is coupled to the hose connection port 190-3 to lock the internal passage. Thus, the hose connection port 190-3 blocks the internal passage.

In a state in which such a configuration is provided, water stored in one or both first water tank 181 and the second water tank 185 may be used for car washing or other cleaning after removing the stopper and coupling the stopper to connect the hose 190-4 to the hose connection port 190-3 of the vehicle.

Then, one or both first pump 183 and the second pump 186 are driven by the controller 160, so that water stored in one or both the first water tank 181 and the second water tank 185 may be supplied to the place of use through the hose connection port 190-3 and the hose 190-4.

At this time, opening states of the first flow control valve 184, the second flow control valve 187, and the third flow control valve 209 are controlled by the controller 160 so that water in the tanks 181 and 185 may pass through the turbulence generator 190 and may flow to the third branch pipe 190-2.

Accordingly, the controller 160 recognizes the operating state of the operation device 15 by the user and drives one or both of the first pump 183 and the second pump 186. Further, the controller 160 allows water stored in one or both of the first water tank 181 and the second water tank 185 to be supplied through the first flow control valve 184, the second flow control valve 187, the turbulence generator 190, the third flow control valve 209, the third branch pipe 190-2, the hose connection port 190-3, and the hose 190-4.

In other words, water is pumped from the first water tank 181 and the second water tank 185 to the hose 190-4, through corresponding pumps 183 and 186. The water is then supplied to the outside through the hose 190-4 so that the water in the first water tank 181 and the water from the second water tank 185 is used for washing or cleaning.

In addition, when the fuel cell vehicle to which the fire extinguishing system of the present disclosure is applied is a cleaning vehicle (e.g., a road cleaning vehicle), there is a need to supply water from the tanks through the hose at high pressure for cleaning. In this case, the first pump 183 and the second pump 186 are driven so that water in the first water tank 181 (the fuel cell exhaust water) and water in the second water tank 185 (supplied from outside) may be simultaneously supplied at high pressure.

In addition, not only when a fire occurs in the vehicle, but also when a fire occurs around the vehicle, water stored in the tanks 181 and 185 may be supplied in the same way through the hose 190-4 to the place where the fire has occurred, so that the vehicle may be used as a simple fire engine.

In addition, when water (the fuel cell exhaust water) in the first water tank 181 and water (supplied from outside) in the second water tank 185 are simultaneously supplied at high pressure, supplying water from the first water tank 181 by the first pump 183 to the turbulence generator 190 while supplying water from the second water tank 185 to the turbulence generator 190 by the second pump 186 may be possible. Further, the controller 160 may control the open states of the first flow control valve 184 and the second flow control valve 187 so that water in the first water tank 181 may be supplied to the second water tank 185 by the first pump 183, and then may be supplied to the turbulence generator 190 form the second water tank 185 by the second pump 186.

In this case, it is possible to use the two pumps, i.e., the first pump 183 and the second pump 186, in series at the same time (e.g., simultaneously). Therefore, there is an effect that may increase a range of the injection pressure control.

As described herein, when supplying water in the first water tank 181 and water in the second water tank 185 through the hose 190-4 to the outside of the vehicle, the coolants of the water cooling system are prevented from being supplied to the turbulence generator 190. In other words, the coolant pump 207 supplying the coolants to the turbulence generator 190 is not driven, and the opening and closing valve 208 provided at the outlet pipe of the coolant pump 207 is maintained in a closed state.

Further, when the temperature sensor (tire fire detector) 14 detects a fire occurring on or at a tire side of the vehicle and the driver operates the operation device 15, the controller 160 controls the first pump 183 and the second pump 186 to be driven simultaneously. Further, at this time, the water in the first water tank 181 and the water in the second water tank 185 are both supplied through the turbulence generator 190 and the third branch pipe 190-2 to the tire fire suppression nozzles 13.

As a result, while the first pump 183 and the second pump 186 are both driven, the water in the first water tank 181 and the water in the second water tank 185, i.e., the fire extinguishing water, are able to be sprayed at high pressure through the tire fire suppression nozzles 13 to the tire 11 where the fire has occurred. Thus, through this, extinguishing fire on the tire side is possible.

In addition, a number of battery packs to which the fire extinguishing system of the present disclosure is applied may be singular or plural. When there is a plurality of battery packs, the outlet pipe 190-1 of the turbulence generator 190 is branched by the number of battery packs, and each branched pipe is connected to each of the respective nozzles (the battery fire suppression nozzle 4).

Figure 5:
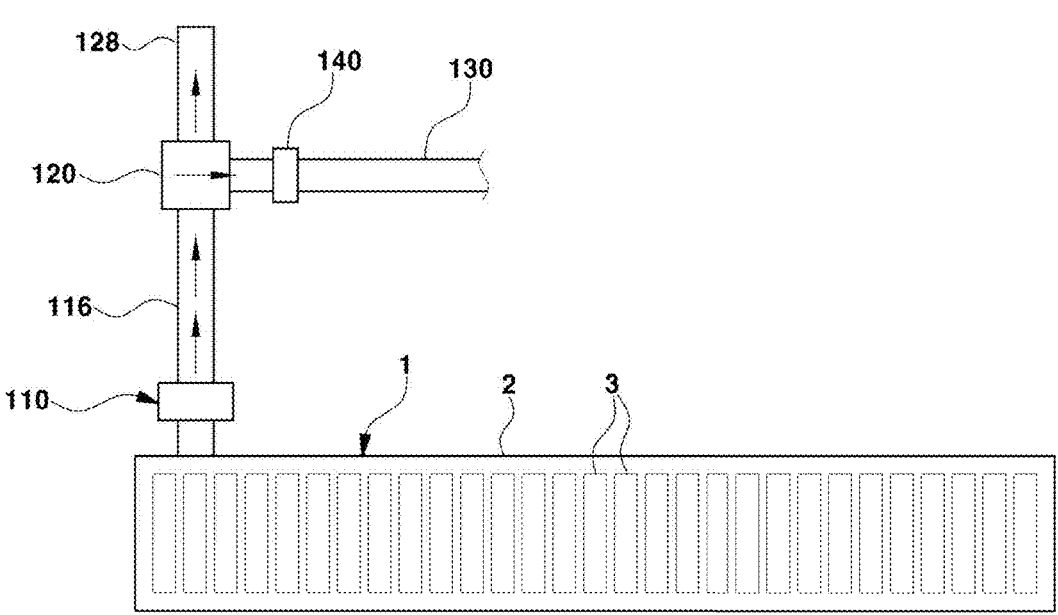
FIG. 5 is a view showing a state in which a gas discharge unit, a vent valve, a gas passage unit, and a gas detector are provided in a battery pack of a vehicle to which the fire extinguishing system according to an embodiment of the present disclosure is applied.

FIG. 4 is a view showing a battery pack 1 of the vehicle to which the fire extinguishing system is applied, according to an embodiment of the present disclosure. FIG. 4 shows both the nozzle 4 provided inside the battery pack 1 and the temperature sensor 5. FIG. 5 is a view showing a state of a gas discharge unit (which is a pressure balancing element 110), a vent valve 120, a gas passage unit 130, and a gas detector 140 that are provided in the battery pack 1 to which the fire extinguishing system according to an embodiment of the present disclosure is applied.

The battery pack 1 includes a battery casing 2 and a battery module disposed to the inside of the battery casing 2 and is composed with a plurality of unit cells, i.e., battery cells 3.

As described herein, the fire extinguishing system according to an embodiment of the present disclosure is configured to suppress a fire occurring inside the battery pack 1, specifically, inside the battery casing 2 surrounding the battery module in the battery pack 1.

In particular, the fire extinguishing system according to an embodiment of the present disclosure can suppress the fire by supplying and filling the inside of the battery casing 2 with the fire extinguishing water. In addition, in order to prevent reignition and thermal runaway in a battery cell 3, a cooled state of the battery cell is maintained with the fire extinguishing water filled inside the battery casing 2.

The battery casing 2 of the battery pack 1 is configured to surround the battery module composed with the battery cells 3, and to provide a seal around the battery module. Accordingly, filling the inside of the battery casing 2 with fire extinguishing water is possible.

When the fire extinguishing water is supplied and filled inside of the battery casing 2, it is not only possible to suppress a fire occurring inside the battery casing is possible but also to maintain the entire battery module composed with the battery cells in a cooled state. Thus, preventing reignition and thermal runaway in the battery cells is possible.

As shown in FIG. 4, in the case of applying to a plurality of battery packs 1, in a state in which each battery fire suppression nozzle 4 is provided inside each respective battery pack 1, the outlet pipe 190-1 of the turbulence generator 190 is branched at a position downstream (rear end) of the third flow control valve (reference numeral 209 in FIG. 1), and a branched pipe 12a (e.g., tube) is connected to each respective battery fire suppression nozzle 4.

The fourth flow control valve 210 is provided at the location where the outlet pipe 190-1 of the turbulence generator 190 is branched. The opening state of the fourth flow control valve 210 is controlled according to the control signal of the controller 160.

The fourth flow control valve 210 supplies the fire extinguishing water to the battery pack 1, i.e., only the battery pack 1 in which the fire is detected by the battery pack fire detector through a branched pipe 12*a* and the fourth flow control valve 210.

The battery fire detector includes the gas detector 140 provided in a gas passage unit 130, and a fire detection sensor (reference numeral 150 in FIG. 7) provided in the vent valve 120.

In addition, the fire extinguishing system according to an embodiment of the present disclosure includes a gas discharge unit provided in the battery pack and configured to discharge gas to the inside of the battery casing 2. The gas discharge unit may be a pressure balancing element 110 provided in the battery casing 2 to provide a passage for gas to flow in and out between the inside and outside of the battery casing 2.

Figure 6:
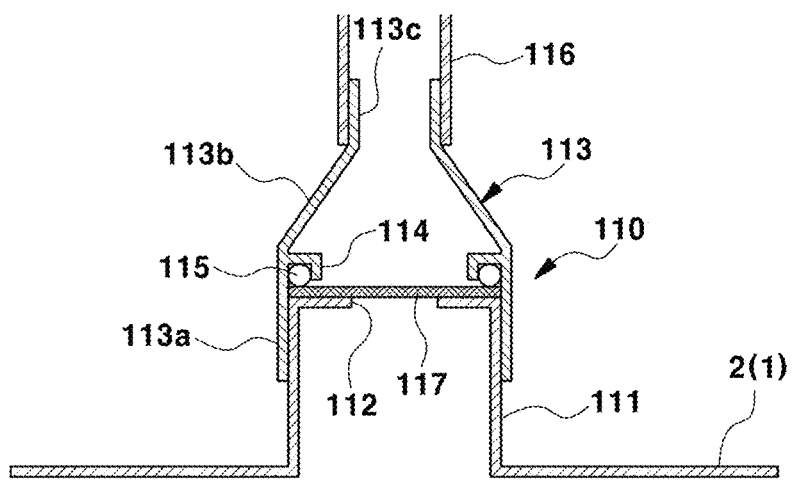
FIG. 6 is a cross-sectional view showing a pressure balancing element provided in a battery casing of a battery pack according to an embodiment of the present disclosure.

FIG. 6 is a cross-sectional view of the pressure balancing element 110 provided in the battery casing 2 of the battery pack 1 according to an embodiment of the present disclosure. As shown, the pressure balancing element 110 is coupled to the battery casing 2 of the battery pack 1 through a venting passage portion 116. The pressure balancing element 110 includes a vent portion 111 having a vent hole 112 through which gas can pass between the inside and the outside of the battery casing 2. The pressure balancing element 110 further includes a connector 113 coupled to the vent portion 111 so that an inner space communicates with the vent hole 112 of the vent portion 111.

Additionally, the pressure balancing element 110 is provided in a structure that is extended lengthwise by a certain length from the connector 113. Further, the internal passage of the pressure balancing element 110 is configured to include a venting passage portion 116 that communicates with an inner space of the vent portion 111, the vent hole 112, and an inner space of the connector 113.

The pressure balancing element 110 of the present disclosure has the vent hole 112 having a relatively large size and a large flow passage cross-sectional area in the vent portion 111. The connector 113 extends by a certain length from the vent hole 112 and the venting passage portion 116.

There is little possibility that moisture can flow into an interior of the battery casing 2 through the venting passage portion 116 if airtightness (e.g., sealability) is well maintained at a connection part of these components. In addition, the venting passage portion 116 is of a certain length.

In an embodiment, a ventilation waterproof membrane member 117 may be provided in the vent hole 112 of the vent portion 111. The ventilation waterproof membrane member 117 blocks an inflow of external moisture while allowing gas to pass therethrough. In this case, the ventilation waterproof membrane member 117 is provided in a structure to block the vent hole 112 of the vent portion 111 as shown in FIG. 6.

In an embodiment of the present disclosure, the ventilation waterproof membrane member 117 may be a fluorine resin film that is possible to pass gas while blocking moisture. Specifically, the ventilation waterproof membrane member 117 may be a film made of EPTFE (expanded polytetrafluoroethylene), known under the trade name of Gore-Tex® film. Further, the ventilation waterproof membrane member 117 may be a film-shaped member.

At this time, using the ventilation waterproof membrane member 117 is advantageous because it is possible to block moisture existing outside the battery casing from flowing through the vent hole 112 of the vent portion 111 while discharging moisture inside the battery casing 2.

The vent portion 111 may be formed in a tubular shape protruding outward from the surface of the battery casing 2. A vent hole 112 of a predetermined diameter or size is provided at the protruding end of the vent portion 111. In an embodiment of the present disclosure, the vent portion 111 may be made in a tube of a circular cross-section, i.e., a circular tube shape from the surface of the battery casing 2 to the outside.

The connector 113 has a large-diameter portion 113*a* having a relatively large diameter at the first end, and a small-diameter portion 113*c* having a smaller diameter than the large-diameter portion 113*a* at the second end. The connector 113 also has a configuration in which the large-diameter portion 113*a* and the small-diameter portion 113*c* are connected by a narrowing-diameter part 113*b* having a shape in which the diameter is gradually reduced.

The large-diameter portion 113*a* may be screwed to an outer circumferential surface of the vent portion 111. For this purpose, a thread may be provided on an inner circumferential surface of the large-diameter portion 113*a* and the outer circumferential surface of the vent portion 111. In addition, a small-diameter portion 113*c* is coupled to the venting passage portion 116. An inner circumferential surface of the small-diameter portion 113*c* may be coupled to an outside circumferential surface of the venting passage portion 116 or an outside circumferential surface of the small-diameter portion 113*c* may be coupled to the inner circumferential surface of the venting passage portion 116.

In this case, both surfaces of the small-diameter portion 113*c* and the venting passage portion 116 may be coupled and secured by thermal fusion. A tubular member such as a hose or a tube may be used as the venting passage portion 116, and a material which is heat-sealable to the connector 113 may be used as the venting passage portion 116.

In addition, a sealing protrusion 114 may be provided to protrude inward in a radial direction on an inner circumferential surface of the connector 113. The connector 113 and the vent portion 111 are screw-fastened so that the ventilation waterproof membrane member 117 is pressed to the vent portion 111 with the sealing protrusion 114 interposed between a sealing member 115.

The sealing member 115 is provided for airtight maintenance (sealing) between the connector 113, the vent portion 111, and the ventilation waterproof membrane member 117. The sealing member 115 may be an O-ring made of an elastic material such as rubber.

The ventilation waterproof membrane member 117 is provided so as to be seated on an outer surface of the protruding end of the vent portion 111 when the large diameter 113*a* of the connector 113 is screwed to an outer circumferential surface of the vent portion 111. Additionally, the ventilation waterproof membrane member 117 is pressed against the vent portion 111 by the sealing protrusion 114 and the sealing member 115. The edge portion of the ventilation waterproof membrane member 117 is pressed by the sealing protrusion 114 and the sealing member 115 to be secured to an outer surface of the protruding end of the vent portion 111.

According to an embodiment of the present disclosure, the sealing protrusion 114 may be configured to have an L-shaped cross-section with one side open on the inner circumferential surface of the large-diameter portion 113*a* of the connector 113. Accordingly, in a state in which the sealing member 115 is inserted into the sealing protrusion 114 that has the L-shaped cross-sectional and the large-diameter portion 113a of the connector is screwed to the vent portion 111, the sealing member 115 may be able to compress the ventilation waterproof membrane member 117 through the opening portion of the sealing protrusion 114.

Additionally, as shown in FIG. 5, the fire extinguishing system according to an embodiment of the present disclosure may further include the vent valve 120 provided on the outlet side of the venting passage (reference numeral 116 in FIG. 6) of the pressure balancing element 110 provided in the battery pack 1, the gas passage unit 130 provided to extend from the vent valve 120, and the gas detector 140 provided in the gas passage unit 130. The gas detector 140 detects gas generated and discharged from the battery pack 1.

Figure 7:
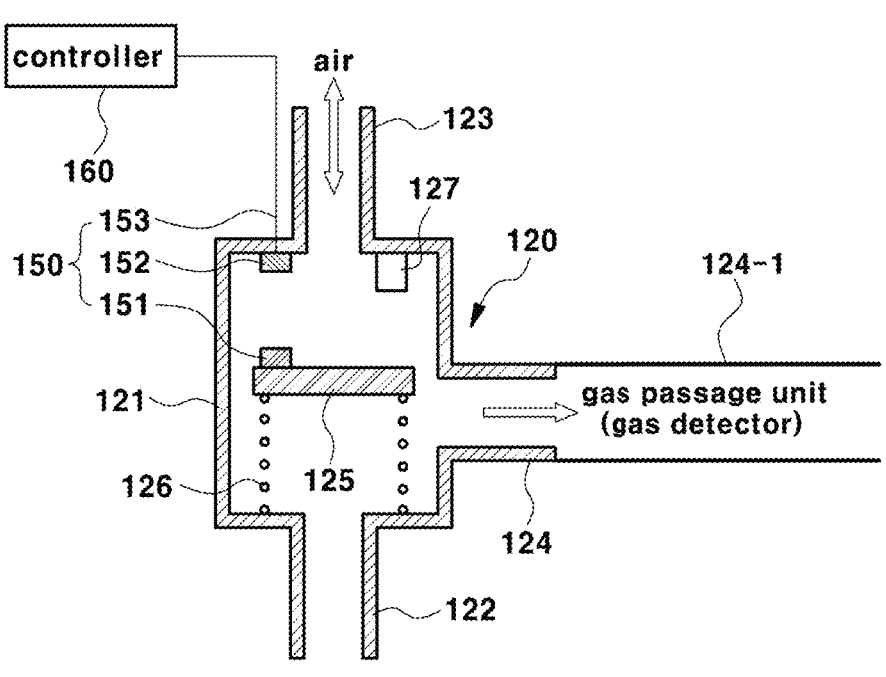
FIGS. 7 and 8 are cross-sectional views showing a configuration of the vent valve in the fire extinguishing system according to an embodiment of the present disclosure.
Figure 8:
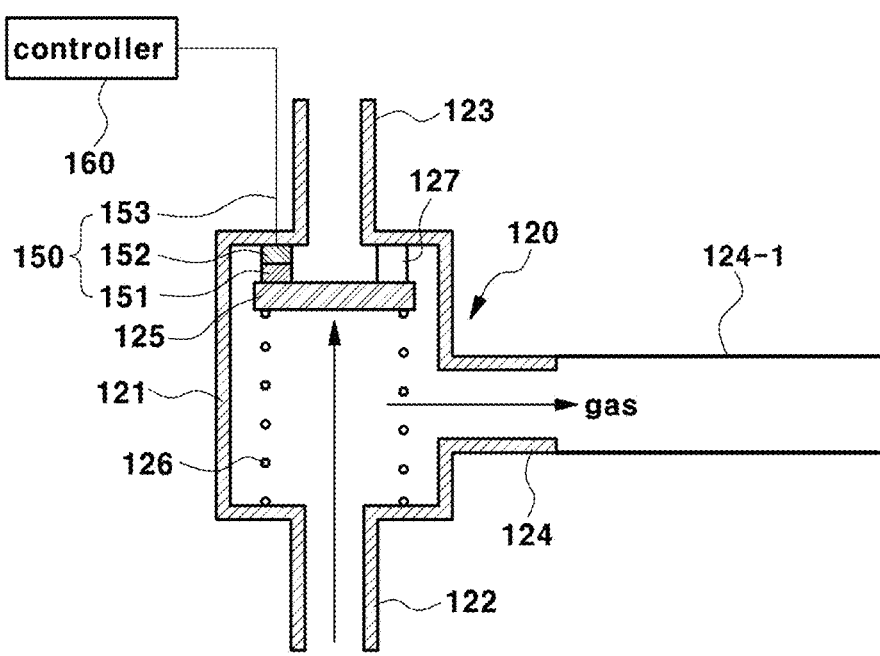

FIGS. 7 and 8 are cross-sectional views showing a configuration of the vent valve in the fire extinguishing system according to an embodiment of the present disclosure. FIG. 7 shows a normal state and FIG. 8 shows a state when a fire occurs.

As shown, the vent valve 120 includes a ventilation port 122 connected to the venting passage portion 116 of the pressure balancing element 110, an air port 123 connected to an air side, and a valve housing 121 providing a connection port 124 that is connected to the gas passage unit 130.

According to an embodiment of the present disclosure, the vent valve 120 is provided for each battery pack 1. In this case, a connection pipe 124-1 is connected to the connection port 124 of the vent valve 120 that is provided for each battery pack 1. Additionally, the connection pipe 120-4 that is connected to the connection port 124 among the vent valve 120 of each battery pack 1 is combined into the gas passage unit 130.

In addition to this, the vent valve 120 is provided in an inner space of the valve housing 121 and includes a valve body 125 that moves to close the air port 123 by the gas discharged from the battery pack 1 when a fire occurs, and a spring 126 is provided to support the valve body 125 in the inner space of the valve housing 121.

The valve housing 121 is connected to the venting passage portion 116 so that the inner space of the valve housing 121 communicates with an inner side of the venting passage portion 116. Accordingly, the inner space of the valve housing 121 communicates with the inner space of the venting passage portion 116, the pressure balancing element 110, and an inner space of the connector 113. Furthermore, the inner space of the valve housing 121 communicates with the inner space of the vent portion 111 and the inner space of the battery casing 2 with the ventilation waterproof membrane member 117 interposed therebetween.

In the vent valve 120, the air port 123 may be positioned at an upper end of the valve housing 121 and may be connected to an access passage unit (reference numeral 128 in FIG. 5) through which air enters and exits between the air and the atmosphere.

The connection port 124 of the vent valve 120 may be positioned on a side of the valve housing 121. The valve body 125 of the vent valve 120 is normally positioned to open the air port 123 and is always positioned to be in an open state with respect to the connection port 124.

The spring 126 is provided to be positioned below the valve body 125 and maintains a position of the valve body 125 so that the valve body 125 is in a position to open the air port 123 and the connection port 124. In particular, in a case of the connection port 124, the spring 126 maintains the position of the valve body 125 to be open, not only in a case of fire but also in normal operating times.

As shown in FIGS. 7 and 8, the valve body 125 is configured to have a shape of a plate and is provided in the inner space of the valve housing 121 in a transverse direction. Additionally, the spring 126 is disposed between the valve housing 121 and the valve body 125 to support the valve body on an upper side.

As described herein, the connection port 124 is a port that is always open regardless of whether a fire occurs, whether gas is discharged from the battery pack 1, and the position of the valve body. Referring to FIG. 7, a normal position of the valve body 125, supported by the spring 126, is higher than a position of the connection port 124. Accordingly, the connection port 124 becomes an always open port rather than a port closed by the valve body 125.

On the other hand, the air port 123 is a port that is opened and closed by the valve body 125. Normally, the valve body 125 opens the air port 123, and in case of a fire, the air port 123 is closed by the valve body 125.

In the event of a fire, a gas generated from the battery pack 1 passes through the pressure balancing element 110 and then flows into the valve housing 121 of the vent valve 120 through the ventilation port 122. The entered gas pushes the valve body 125 upward, and at this time, the valve body 125 overcomes a force of the spring 126 and moves toward the air port 123, thereby closing the air port 123. The connection port 124 remains in an open state, regardless of the position of the valve body 125.

Accordingly, when the air port 123 is in an open state, the internal space of the air port 123, the inner space of the valve housing 121, the inner space of the venting passage portion 116 of the pressure balancing element 110, the inner space of the connector 113, and the inner space of the vent portion 111 with the ventilation waterproof membrane member 117 interposed therebetween, are used as a gas passage for performing pressure balancing between the inside and the outside of the battery casing 2.

Normally, as shown in FIG. 7, gas enters and exits between the inside and the outside of the battery pack 1 through the pressure balancing element 110, in the open state of the air port 123. Thus, pressure between the inside of the battery pack and the outside of the battery pack is balanced.

In case of a fire, as shown in FIG. 8, the air port 123 is closed by the valve body 125, so that the gas generated from the battery pack 1 is not discharged into the atmosphere. At this time, the gas generated from the battery pack 1 may be discharged only through the connection port 124 that is normally open.

In this way, the gas discharged through the connection port 124 flows to a connection pipe 124-1, then flows to the gas passage unit 130 and passes the gas detector 140 in the gas passage unit 130.

Accordingly, the gas is detected through the gas detector 140, and the controller 160 may determine that a fire has occurred from the signal of the gas detector 140. In this case, the gas is generated from the battery pack 1 at an initial stage of the fire, more specifically, from the flames generated from the battery cell 3 that is accommodated in the battery casing 2. A main component of flammable gas is carbon monoxide (CO).

In an embodiment of the present disclosure, the vent valve 120 may be provided with the fire detection sensor 150. The fire detection sensor 150 is for detecting an occurrence of a fire inside each respective battery pack 1 separately from the gas detector 140. The fire detection sensor 150 is provided for each respective battery pack 1, and the gas detector 140 is connected to the vent valve 120 of each respective battery pack 1.

The fire detection sensor 150, as shown in FIGS. 7 and 8, is configured to include a first magnet resistance 151 provided in the valve body 125, and a second magnet resistance 152, that is stationary, provided at a location near the air port 123 in the inner surface of the valve housing 121. Thus, the first magnet resistance 151 may be attached to the second magnet resistance 152 when the valve body 125 is moved to a position to close the air port 123, and a wiring 153 that connects the first magnet resistance 151 to the controller 160, allows electricity to pass between thereof.

The controller 160, not shown in the drawing, may have a current applying unit (not illustrated) for applying a current to the wiring 153 that connects the first magnet resistance 151 to the controller, and a current detection unit that detects a current value applied to the wiring 153. Accordingly, in the controller 160, a current of a value determined by the current applying unit may be applied through the wiring 153, and at the same time, the current value flowing through the wiring 153 may be detected by the current applying unit.

Referring to FIGS. 7 and 8, the first magnet resistance 151 is attached to the first end of the valve body 125, and the second magnet resistance 152 is attached to a position on one side opposite to the first magnet resistance 151 on the inner surface of the valve housing 121. In this structure, a buffer member 127 may be provided on the other side of the valve body 125 or the other side of the inner surface of the valve housing 121.

The buffer member 127 may be made of a material having elasticity and shock absorption performance, such as rubber. As shown in FIG. 8, the buffer member 127 prevents the valve body 125 from direct contact with the valve housing 121. Further, when a fire occurs the valve body 125, by the force of gas, rises upward to close the air port 123, and the buffer member 127 serves to absorb shock between the valve body 125 and the valve housing 121.

Figure 9:
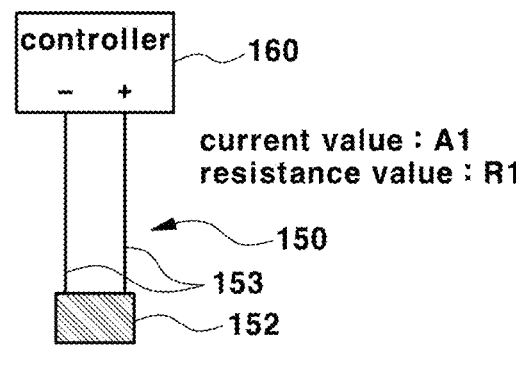
FIGS. 9 and 10 are views showing an operating state of a fire detection sensor provided in the vent valve according to an embodiment of the present disclosure.
Figure 10:
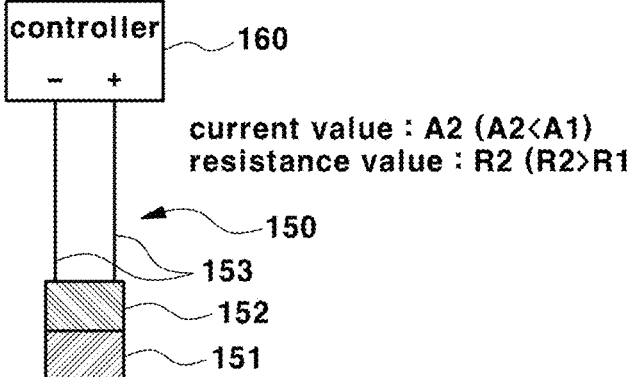

FIGS. 9 and 10 are views showing an operation state of the fire detection sensor provided in the vent valve 120 according to an embodiment of the present disclosure. FIG. 9 shows a state in normal operating times (when no fire occurs), and FIG. 10 shows a state when a fire occurs.

Normally, as shown in FIG. 9, when current is applied from the controller 160 through the wiring 153, only the wiring 153 and the second magnet resistance 152 of the valve housing 121 become electrified (e.g., charged with electricity). On the other hand, in case of a fire, when the valve body 125 rises by the gas generated from the battery pack 1 and closes the air port 123, as shown in FIG. 10, the first magnet resistance 151 is attached to the second magnet resistance 152 by magnetic force.

In this way, when the first magnet resistance 151 and the second magnet resistance 152 are attached and in contact with each other, the resistance value increases in the conduction path by the entirety of the first magnet resistance 151 and the second magnet resistance 152, and the current flowing through the wiring 153 (i.e., the current strength) changes.

In other words, the value of the current (reference current value) A1 is relatively high when the first magnet resistance 151 and the second magnet resistance 152 are apart, and the current flows through only the wiring 153 and the first magnet resistance 151 path. Then, when the first magnet resistance 151 and the second magnet resistance 152 are in contact with each other, the total resistance value increases, and the value (actual current value) A2 of the current flowing through the wiring 153, the first magnet resistance 151, and the second magnet resistance 152 is lower than when the two magnet resistances are apart.

Accordingly, the controller 160 reads the value of the current flowing through the wiring 153 (a signal value of the fire detection sensor) and is set to determine that a fire has occurred when the value of the current is less than the set value. If the value of current detected by the controller 160 falls below the set value, it can be determined that a fire has occurred.

Alternatively, the controller 160 may be set to determine that a fire has occurred when the amount of change in the current value is greater than or equal to a set amount. As such, the controller 160 may read the value of the current flowing through the wiring 153 of the fire detection sensor 150 and determine whether a fire has occurred in the battery pack 1, primarily from the amount of changes in the current value.

Although only one battery pack 1 is illustrated in FIG. 5, the pressure balancing element 110, the vent valve 120, and the access passage unit 128 are provided for a plurality of the battery packs 1 mounted on the vehicle, respectively.

At this time, as described herein, the connection pipe 124-1, connected to the connection port 124 among the vent valve 120 of each of the respective battery packs 1 of the plurality of battery packs, is combined into one, as the gas passage unit 130, and then, in the combined gas passage unit 130 the gas detector 140 can be provided.

In the fire extinguishing system configured for the plurality of the battery packs 1, together with the pressure balancing element 110 and the vent valve 120, the fire detection sensor 150, provided in the vent valve 120, is also provided individually for each respective battery pack 1.

As a result, by the signal of the fire detection sensor 150 that is installed for each respective battery pack 1, the controller 160 is able to extinguish the battery pack in which a fire has occurred. In other words, when the current value, which is the signal value of fire detection sensor 150 among all the battery packs 1, is less than or equal to the set value or the amount of changes in the current value is greater than the set amount, the corresponding battery pack may be determined as a battery pack in which fire has occurred.

The gas detector 140 is provided in the gas passage unit 130 and may be a sensor for detecting gas generated in the battery cell 3 when a fire occurs. For example, the sensor may be a carbon monoxide measuring sensor for detecting the concentration of carbon monoxide (CO).

The gas detector 140 is connected to the controller 160 and is configured to input a signal according to the fire detection to the controller 160. Accordingly, the controller 160 may be able to recognize that a fire has occurred inside the battery pack 1 from the signal of the gas detector 140.

For example, the controller 160 may determine that a fire has occurred inside the battery pack 1 when the concentration of carbon monoxide (Z) in the gas detected by the gas detector 140 is greater than or equal to a preset concentration.

Accordingly, the controller 160 may identify the battery pack in which a fire has occurred among all the battery packs 1 loaded in the vehicle from the signal of the fire detection sensor 150. The controller 160 may finally determine that a fire has occurred in the battery pack 1 mounted on the vehicle from the signal of the gas detector 140.

In addition, the fire extinguishing system, according to an embodiment of the present disclosure, may further include a temperature sensor 5 provided inside the battery pack 1 to detect the temperature of the battery cell 3 as shown in FIG.

4. The temperature sensor 5 is connected to the controller 160 and is provided to input a signal to the controller according to the temperature of the battery cell 3.

Accordingly, the controller 160 may recognize the temperature of the battery cell 3 from the signal of the temperature sensor 5 in real-time. In the controller 160, the temperature of the battery cell detected by the temperature sensor 5 may be used to monitor whether reignition and thermal runaway occurred in the battery cell.

For example, when the temperature of the battery cells detected by the temperature sensor 5 exceeds a predetermined set temperature, the controller 160 may determine that reignition or thermal runaway has occurred in the battery cell in the battery pack.

As described herein, according to an embodiment of the present disclosure, after a fire is suppressed for the first time by supplying fire extinguishing water to the inside of the battery pack 1 in which the fire (primary ignition) has occurred, the controller 160 may continuously monitor whether further reignition or thermal runaway may occur in the battery cell based on the temperature of the battery cell detected by the temperature sensor of the battery pack in which the fire is firstly suppressed.

Furthermore, according to an embodiment of the present disclosure, when there is a fire inside the battery pack as described herein or it is determined that reignition or thermal runaway occurs in the battery cell, at the determination time, the controller 160 may display the information about the first reignition, thermal runaway in real-time through a warning device 220 of the vehicle, or may warn the driver.

The warning device 220 may be a warning light of an instrument cluster. Alternately, the warning device 220 may be a display device capable of displaying the information about a fire occurrence or may be a sound output device capable of outputting a sound such as a warning sound.

Furthermore, the controller 160 may transmit the vehicle fire occurrence information and the vehicle location information through a communication device in the vehicle to the nearest fire station so that a fire engine arrives to the vehicle from a fire station.

The coolant used in the water cooling system of the vehicle is slightly different for each of the parts to be cooled but has a composition in which water and ethylene glycol are mixed. The composition is the same as an extinguishing fluid capable of extinguishing fires. In other words, main substrates of the extinguishing fluid are water and ethylene glycol.

Therefore, the coolant of the water cooling system includes water and ethylene glycol, which are two of the main substrates of the extinguishing fluid and are used as auxiliary. Thus, a greater effect can be seen in extinguishing fire occurring in the vehicle. Compared to using fuel cell discharge water or water supplied from the outside space alone, when the coolant of the water cooling system includes ethylene glycol that is added thereto and used accessorily, the fire extinguishing effect of extinguishing fire may be increased.

However, among the coolant of the water cooling system, the fuel cell stack coolant serves a very important role, and it is recommended not to use the fuel cell stack coolant as much as possible. Therefore, the fuel cell stack coolant may be selectively used only when certain conditions are sufficient in the lowest priority.

Furthermore, it is advantageous to ensure that the fuel cell discharge water stored in the first water tank 181 and the water supplied from the outside space and stored in the second water tank 185 are supplied to the fire area in a sufficiently mixed state with the coolant of the water cooling system. Therefore, in the present disclosure, the turbulence generator 190 allows the water store in the tank and the coolant to be sufficiently mixed.

In the present disclosure, in order to extinguish a fire that occurred in the battery pack, the fire extinguishing water is filled inside the battery pack so that the battery cell in the battery pack is fully immersed with the fire extinguishing water. The most effective method of extinguishing battery fires is a method of injecting a fluid fire-extinguishing agent into the battery pack to immerse the battery cell. With the method, there are effects of extinguishing fire and cooling underwater electric discharge.

In the fuel cell vehicle, the battery cell in the high-voltage battery pack may not be fully immersed even when the entire coolant of the water cooling system is used. Accordingly, after the fuel cell discharge water is store or the water supplied from the outside space is stored, the stored fuel cell discharge water and the supplied water are mainly used as the fire extinguishing water for extinguishing fires. Additionally, the coolant of the water cooling system may be used accessorily.

In this case, since water can be sufficiently supplied, the battery cell in the battery pack can be sufficiently immersed, and effective responses to the first ignition, the second reignition, and the third reignition in the battery pack are possible.

For example, in an initial extinguishment of the first ignition, about 50% of the inside space of the battery pack is filled with fire extinguishing water to immerse the battery cell, and in the second reignition, about 70% of the inside space of the battery pack is filled with the fire extinguishing water to immerse the battery cell. Furthermore, in the third reignition, 100% of the inside space of the battery pack is filled with the fire extinguishing water to immerse the battery cell. A reignition is a reoccurrence of fires in the same battery pack.

As described herein, when the second reignition occurs after the first ignition or an additional reignition occurs after the second reignition, the controller that controls a supply of the fire extinguishing water to the battery pack 1, may gradually increase the amount of the fire extinguishing water filled in the battery pack in stages and for each time a reignition occurs. Compared to a total internal space of the battery pack, a ratio (%) of the space filled with the fire extinguishing water may increase in stages so that the ratio becomes a predetermined ratio each time a reignition occurs.

Figure 11:
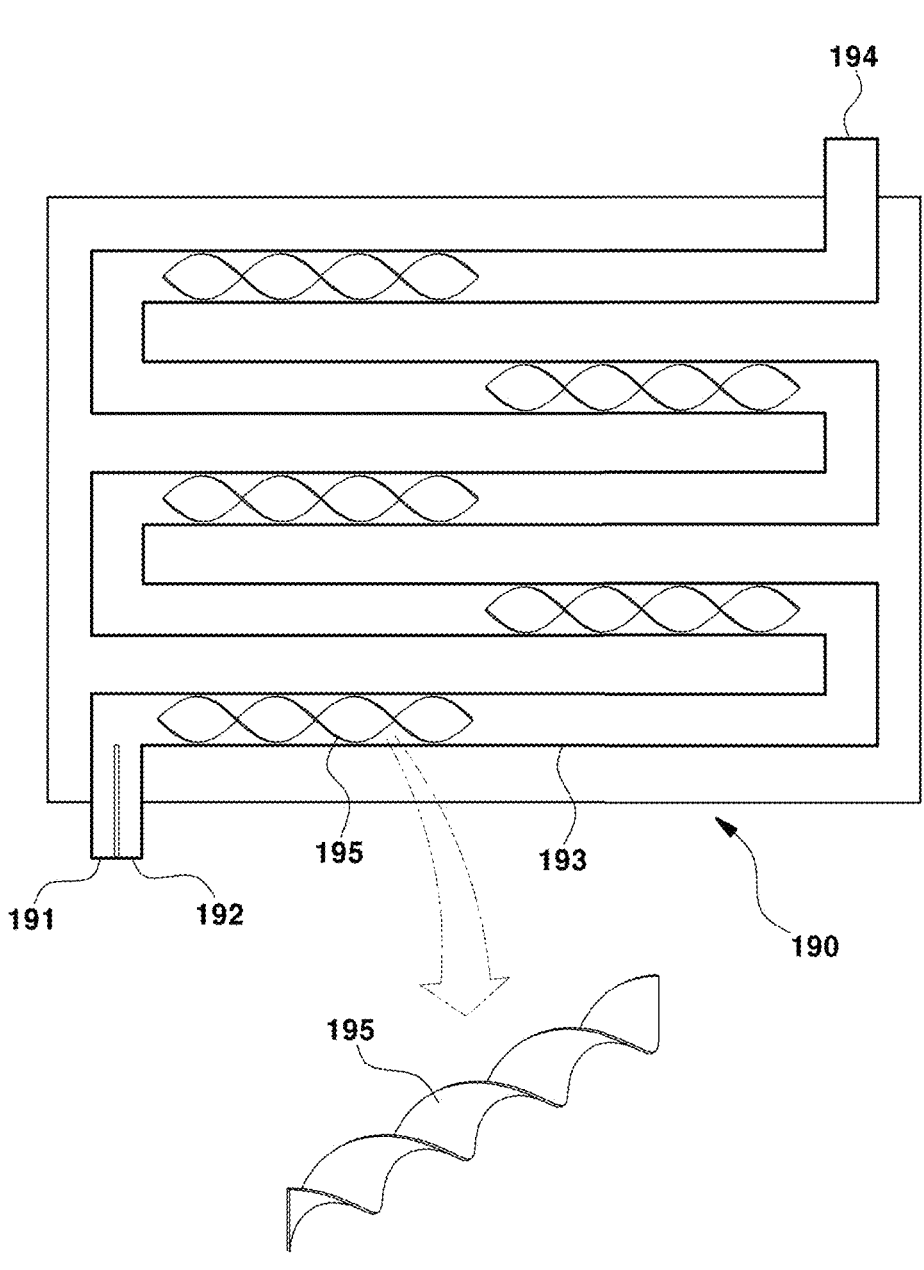
FIG. 11 is a diagram showing a turbulence generator according to an embodiment of the present disclosure.

FIG. 11 is a diagram showing a turbulence generator according to an embodiment of the present disclosure. The turbulence generator 190 is provided to sufficiently mix water (the fuel cell discharge water) of the first water tank 181 and water (supplied water) of the second water tank 185, the waters inflowing through the fuel cell exhaust water inlet port 191, with the coolant (mixture of ethylene glycol) inflowing through the coolant inlet port 192.

The turbulence generator 190 may be the internal passage 193 with a turbulator 195. The turbulator 195 may have a structure capable of rotating or vertically moving the water and the coolant inflowing respectively through the inlet ports 191 and 192.

Referring to FIG. 11, the turbulator 195 has a plate shaped with a spiral structure that rotates the two fluids flowing in the internal passage 193 of the turbulence generator 190 through the two inlet ports 191 and 192 and allowing the two fluids to flow along in turbulence.

The shape or structure of the turbulator 195 is illustrated as an example and the present disclosure is not limited thereto. Any structure of the turbulence generator 190 that is capable of generating turbulence of a different fluid inflowing through a separate inlet port and ensuring that double fluids are mixed well may be adopted in the present disclosure.

Hereinafter, an operating state of the fire extinguishing system, according to an embodiment of the present disclosure, is described.

Figure 12A:
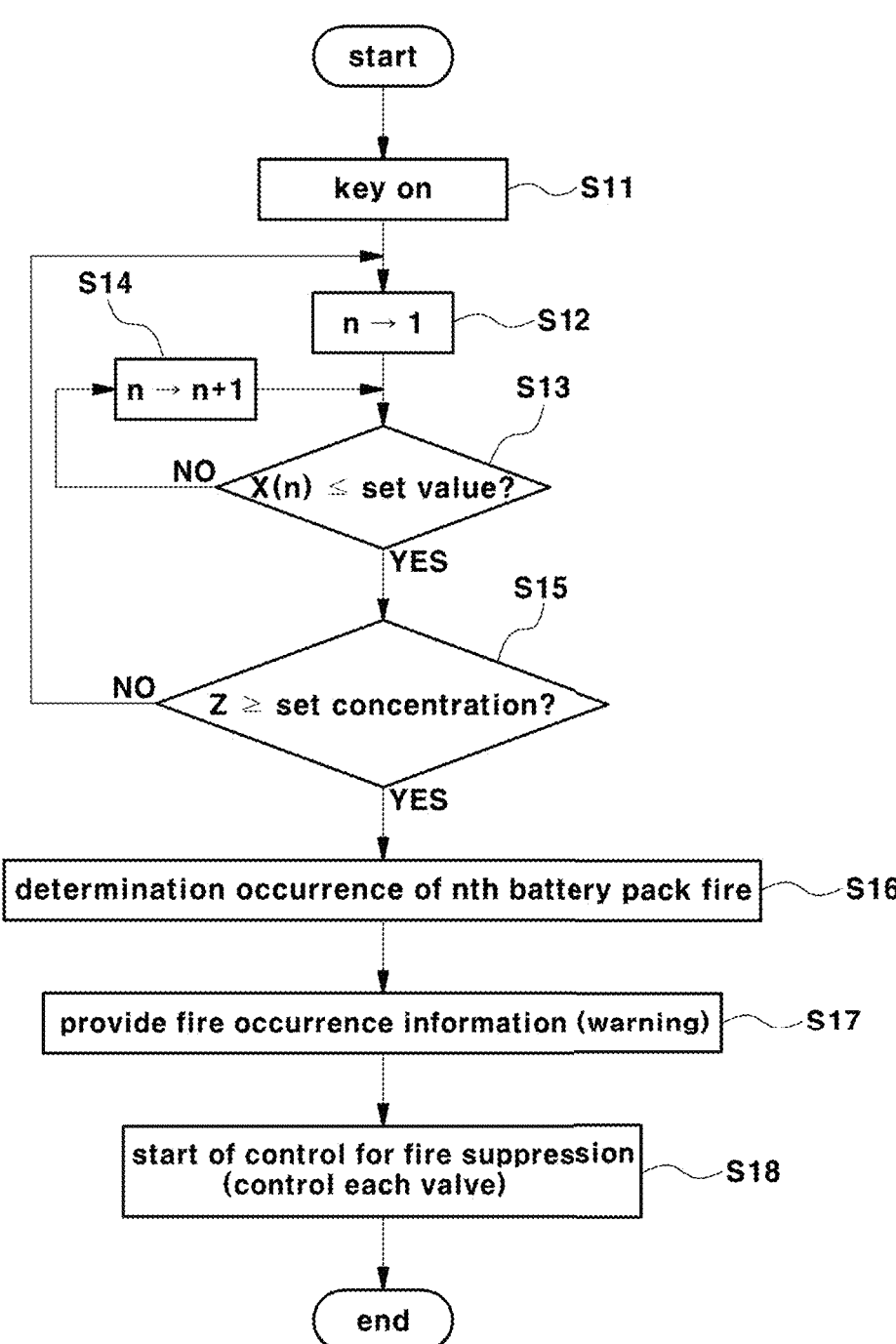
FIGS. 12A and 12B are flowcharts demonstrating an operating state of the battery pack when a fire occurs according to an embodiment of the present disclosure.
Figure 12B:
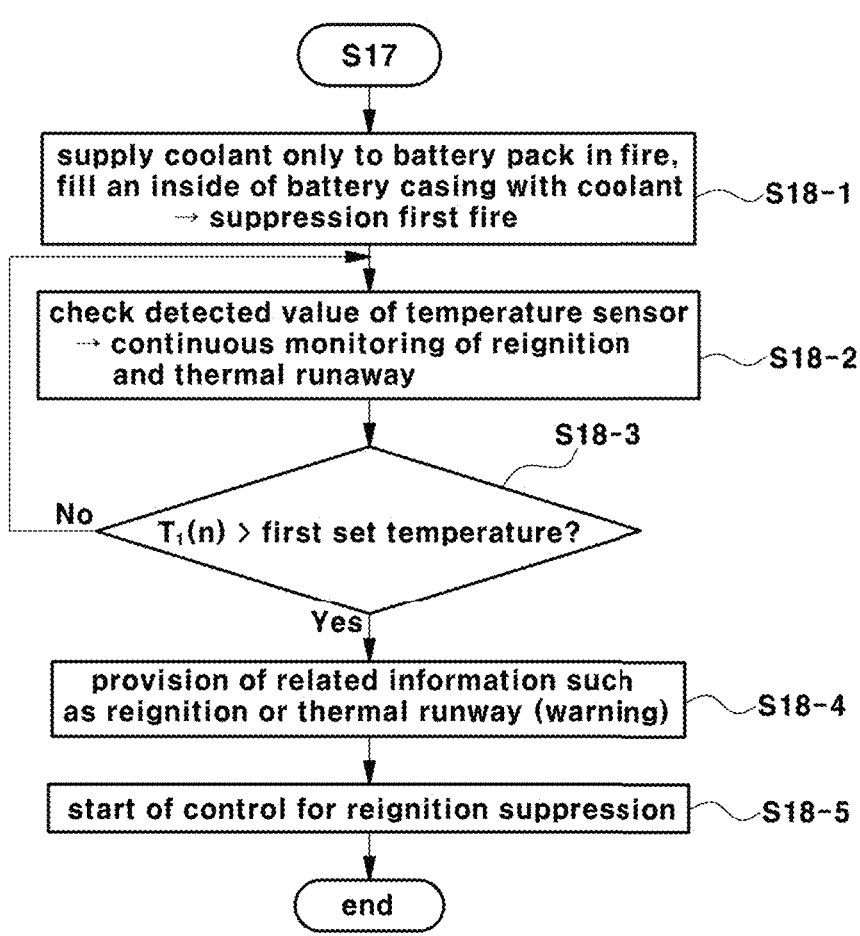

FIGS. 12A and 12B are flowcharts demonstrating an operating state of the battery pack 1 when a fire occurs in an embodiment of the present disclosure, and illustrate an example in which a plurality of battery packs (n=1, 2, 3, . . . ) are mounted to a vehicle.

First, a fire occurrence in the battery pack 1 is detected by a fire detection sensor 150 installed in the battery pack 1 and the gas detector 140 of the gas passage unit 130, in a state of vehicle key-on at S11. The controller 160 monitors whether or not a fire occurs in the battery pack 1 in real-time from a signal of the fire detection sensor 150 and the gas detector 140, at S12 to S15.

When a fire occurs in the battery pack 1, gas is released from the burning battery pack 1 (e.g., battery pack 1 on fire), and the gas released from the battery pack 1 passes through the pressure balancing element 110 and the vent valve 120 in order. The gas then flows along the gas passage unit 130.

The controller 160 may determine whether fire occurs in the battery pack 1 from a signal of the gas detector 140, and the controller 160 may identify a battery pack 1 on fire, among the whole plurality of battery packs 1, from a signal of the fire detection sensor 150.

In describing a process of identifying a battery pack on fire, fundamentally, the controller 160 reads and monitors a signal value of the fire detection sensor 150 provided for each battery pack 1, i.e., a value of a current flowing through the wiring 153 of the fire detection sensor 150 in real-time, and checks whether or not a current value (X(n)) of each wiring 153 is less than or equal to a preset value at S12 to S14.

The gas released from the battery pack 1 on fire and passing through the pressure balancing element 110 flows into the vent valve 120. The gas flowing into the vent valve 120 pushes the valve body 125 so that the valve body 125 moves. The valve body 125 then overcomes a force of the spring 126 and moves to a position where the valve body 125 closes the air port 123 to prevent the gas from being discharged to the atmosphere through the air port 123 (referring to FIG. 8).

As described herein, after the valve body 125 moves to the closing position of the air port 123, the first magnetic resistance 151 and the second magnetic resistance 152 of the fire detection sensor 150 are brought into a mutually attached and contacted state (referring to FIG. 8). The controller 160 may read a value of the current flowing along the wiring 153.

When a value of the current flowing along the wiring 153 is less than or equal to the preset value (or a change amount of the current value is equal to or greater than a preset value), the controller 160 determines that a fire has occurred in the battery pack 1. Therefore, the controller 160 can identify a battery pack 1 on fire among the entire battery pack 1 (e.g., the plurality of battery packs 1 in the vehicle).

In addition, the gas discharging from the battery pack 1 and passing through the pressure balancing element 110 and the vent valve 120 sequentially, flows to the gas passage unit 130 and then passes through the gas detector 140 provided in the gas passage unit 130.

In the gas detector 140, the concentration (Z) of a specific component in the gas passing through the gas passage unit 130, for example, carbon monoxide (CO) may be detected, and a signal according to the concentration of the specific component in the gas is output to the controller 160.

Therefore, the controller 160 checks whether or not the concentration (Z) of a specific component in the gas is equal to or greater than a preset concentration (e.g., 20 ppm) from a signal of the gas detector 140 at S15. Additionally, when the concentration is equal to or greater than the preset concentration ('Z≥preset concentration'), the controller 160 determines where the fire is detected in the battery pack 1 of the plurality of battery packs ('nth battery pack' in FIG. 12A), by the fire detection sensor 150 at S16.

As described herein, at S13, even when a signal value of the fire detection sensor 150 is less than or equal to the preset value, at S15, only when in the gas detected by the gas detector 140 the concentration (Z) of carbon monoxide (CO) is equal to or greater than the preset concentration, the controller determines that a fire has occurred in the battery pack 1, so that the risk of malfunction is reduced.

Next, when the controller 160 determines that a fire has occurred in the battery pack 1, the controller 160 operates the warning device 220 to warn a driver and a passenger of the fire at 517. With a communication device in a vehicle, the controller 160 transmits the vehicle fire occurrence information and the vehicle location information to the nearest fire station, so that a fire engine may arrive from a fire station to assist the vehicle.

Furthermore, the controller 160 performs control to suppress the fire at S18. The current fire occurrence state is a first ignition state in which the fire first occurred inside the battery pack 1. The coolant for the battery no longer needs to perform the original function thereof, so the coolant can be used to suppress the first ignition condition inside the battery pack 1.

In other words, all of the coolant for the battery, the fuel cell discharge water stored in the first water tank 181, and water stored in the second water tank 185 (which is supplied water) are mixed together through the turbulence generator 190 and then inserted into the battery pack 1 where the fire occurrence is detected, at S18-1.

To this end, the controller 160 operates all of the first pump 183, the second pump 186, and the coolant pump 207. The controller 160 also controls operations of the first flow control valve 184, the second flow control valve 187, the third flow control valve 209, the opening and closing valve 204 between the tank for the battery coolant 201 and the coolant pump 207, and the opening and closing valve 208 between the coolant pump 207 and the turbulence generator 190.

Furthermore, the controller 160 controls an opening amount state of the fourth flow control valve 210 so that the tube 12a, which is connected to the battery pack 1 that is on fire from an outlet pipe 190-1 of the turbulence generator 190, is opened. Accordingly, fire extinguishing water that has passed through the turbulence generator 190 may pass through the third flow control valve 209 and then may be supplied only into the battery pack on fire through the fourth flow control valve 210.

In other words, in order to supply the coolant for a battery from the tank for the battery coolant 201 into the turbulence generator 190, the two opening and closing valves 204 and 208 are opened. The opening amount states of the first flow control valve 184 and the second flow control valve 187 are controlled so as to supply the fuel cell discharge water stored in the first water tank 181 and water stored in the second water tank 185 into the turbulence generator 190. Further, the opening amount states of the third flow control valve 209 and the fourth flow control valve 210 are controlled so that the fire extinguishing water that has passed through the turbulence generator 190 may be supplied only into the battery pack on fire.

Next, in the battery pack 1 where the fire occurs, the temperature of the battery cell 3 detected by the temperature sensor 5 is checked, and reignition and thermal runaway are continuously monitored, at S18-2, and S18-3. Further, when the temperature (T1(n)) of the battery cell 3 is greater than a first preset temperature, the controller 160 determines that a second reignition has occurred in the battery pack.

As described herein, when the controller 160 determines that the second reignition has occurred, control to suppress reignition is performed, at S18-5. The controller 160 opens the opening and closing valve 206 between the tank for the power electronic system coolant 203 and the coolant pump 207, shuts off the opening and closing valve 204 between the tank for the battery coolant 201 and the coolant pump 207, and maintains an open state of the opening and closing valve 208 between the coolant pump 207 and the turbulence generator 190.

In addition, when the first pump 183, the second pump 186, and the coolant pump 207 are all driven, the first flow control valve 184, the second flow control valve 187, the third flow control valve 209, and the fourth flow control valve 210 remain the same as in the first ignition state.

Thereby, the coolant for the power electronics system (PE) is mixed with the fuel cell exhaust water stored in the first water tank 181 and the water stored in the second water tank 185 (which is supplied water) through the turbulence generator 190. The mixed coolant and water is injected inside the battery pack 1 where the second reignition has occurred, and eventually, the second reignition and thermal runaway in the battery cell 3 in the battery pack may be prevented.

After that, when the temperature (T1(n)) of the battery cell, detected by the temperature sensor in the battery pack in which the second reignition has occurred, again exceeds the set temperature (the first set temperature), the controller 160 determines that further reignition and thermal runaway have occurred again. Finally, the coolant for the fuel cell stack is injected into the battery pack 1 in which the further reignition and thermal runaway have occurred.

At this time, when the opening and closing valve 205 between the tank for the fuel cell stack coolant 202 and the coolant pump 207 is opened, the opening and closing valve 206 between the tank for the power electronic system coolant 203 and the coolant pump 207 is closed. Further, the opening and closing valve 208 between the coolant pump 207 and the turbulence generator 190 maintains an open state.

In addition, when the first pump 183, the second pump 186, and the coolant pump 207 are all driven, the first flow control valve 184, the second flow control valve 187, the third flow control valve 209, and the fourth flow control valve 210 maintain the previous state.

As a result, the coolant from the tank for the fuel cell stack coolant 202 is mixed with the fuel cell exhaust water stored in the first water tank 181 and the water stored in the second water tank 185 (which is supplied water), through the turbulence generator 190, and then injected together into the battery pack 1 in which the third reignition has occurred. Eventually, the third reignition and thermal runaway in the battery cells 3 in the battery pack 1 may be prevented or extinguished.

Figure 13:
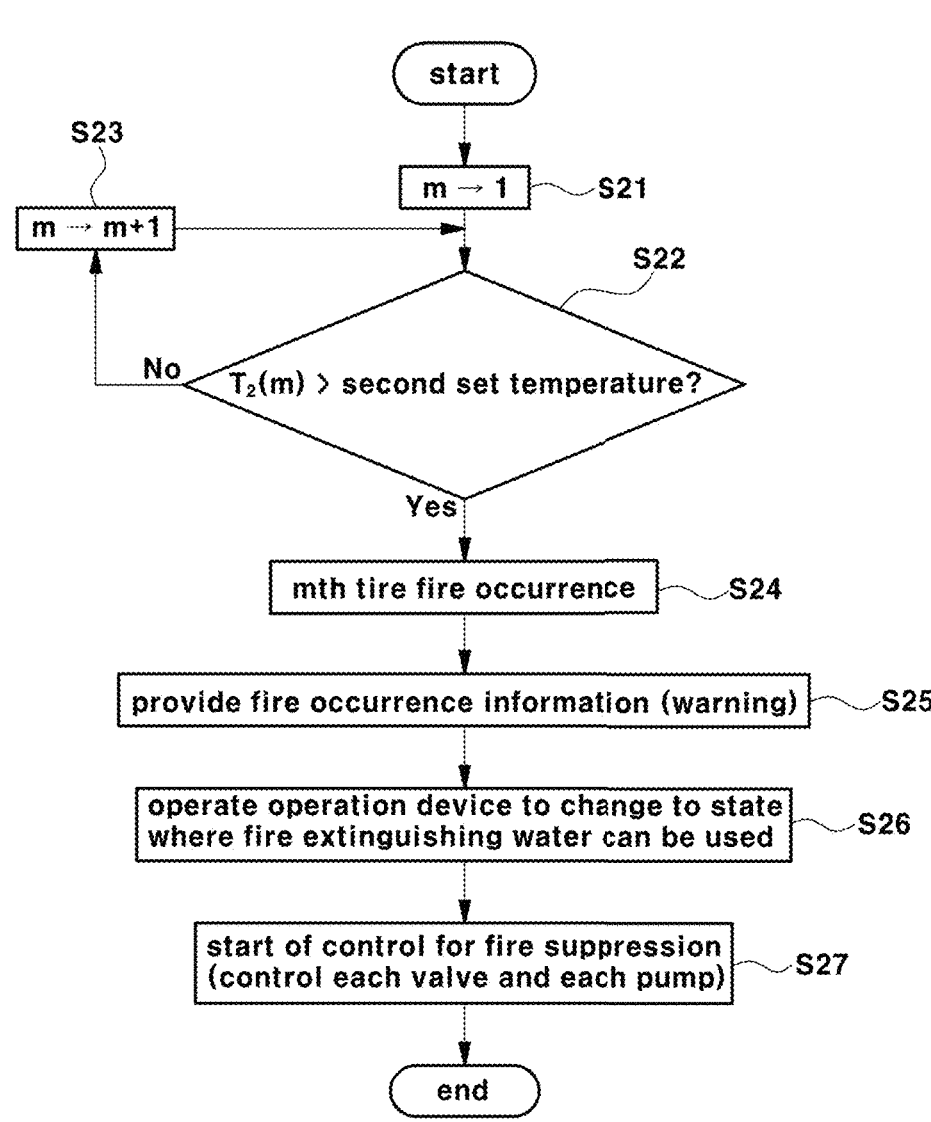
FIG. 13 is a flow chart demonstrating an operation state when a tire fire occurs according to an embodiment of the present disclosure.

Next, the following FIG. 13 is a flowchart illustrating an operation state when a tire fire occurs according to an embodiment of the present disclosure. An example is shown in which fire detection and fire suppression is performed for a plurality of tires (m=1, 2, 3, . . . ) at different positions on a vehicle.

The controller 160 monitors the temperature (T2(m)) detected by the temperature sensor, which is the tire fire detector 14 provided on each tire (S21~S23). When the temperature detected by the temperature sensor (T2(m)) exceeds the set temperature (the second set temperature), the controller 160 determines that a fire has occurred in or at the tire S24.

Then, the controller 160 operates the in-vehicle warning device 220, such as on an instrument cluster, to notify the driver, passengers, or surrounding people of the fire occurrence S25.

Then, when the driver operates the operation device 15, mounted near the tire on which fire has occurred S26, the controller 160 receives a signal from the operation device 15 and controls the tire for fire suppression S27.

When suppressing a tire fire, the controller 160 opens all the pipelines from the third flow control valve 209 to the tire fire suppression nozzles 13 on the side of the tire where the fire occurred through valve control. Thus, the turbulence generator 190 and the fire extinguishing water supplied through the third flow control valve 209 may be supplied to the tire fire suppression nozzle 13 on the tire side. Through this, the fire in the tire may be suppressed.

To this end, the controller 160 controls the first flow control valve 184, the second flow control valve 187, the third flow control valve 209, the opening and closing valve 206 between the coolant tank for the power electronic system (PE) and the coolant pump 207, and the opening and closing valve 208 between the coolant pump 207 and the turbulence generator 190. Thus, the coolant for the power electronic system stored in tank for the power electronic system coolant 203, the fuel cell exhaust water stored in the first water tank 181, and the water stored in the second water tank 185 are mixed in the turbulence generator 190, and then supplied to the tire fire suppression nozzles 13.

At this time, all of the opening and closing valve 204 and 205 between the coolant tanks 201 and 202 and the coolant pump 207, except for the tank for the power electronic system coolant 203, are maintained in a closed state. Coolant for power electronic systems (coolant for motor, inverter, and transmission) is used to suppress the tire fire, since this coolant has relatively low importance compared to coolant for batteries or coolant for fuel cell stacks. Thus, coolant for batteries or fuel cell stacks is not used for suppressing the tire fire.

Thus, the above detailed description should not be interpreted as being limited in all aspects, and instead as being illustrative. The scope of the present disclosure should be decided by rational analysis of the attached claims. All the changes within an equivalent scope of the present disclosure are included in the scope of the present disclosure.

What is claimed is:

1. A fire extinguishing system for a vehicle, the fire extinguishing system comprising:
   a fuel cell system including a fuel cell stack configured to be mounted on the vehicle;
   a first water tank configured to store fuel cell exhaust water generated and discharged from the fuel cell stack;
   a first pump fluidly connected to the first water tank and configured to pump the fuel cell exhaust water stored in the first water tank;

a second water tank configured to store supplemental water sourced externally of the vehicle;

a second pump fluidly connected to the second water tank and configured to pump the supplemental water;

a cooling circuit comprising a plurality of coolant tanks configured to store a plurality of coolants, the plurality of coolants comprising a battery coolant, a fuel cell stack coolant, and a power electronic system coolant, the plurality of coolant tanks comprising:

a battery coolant tank configured to store the battery coolant;

a fuel cell stack coolant tank configured to store the fuel cell stack coolant;

a power electronic system coolant tank configured to store the power electronic system coolant; and a coolant pump fluidly connected to each coolant tank of the plurality of coolant tanks through corresponding outlet pipes and configured to pump one or more of the plurality of coolants to a downstream path;

a turbulence generator fluidly connected to an outlet of the first pump, an outlet of the second pump, and an outlet of the coolant pump, the turbulence generator comprising a mixing chamber with an internal flow disturbing structure and configured to generate a turbulent mixture of the fuel cell exhaust water, the supplemental water, and at least one coolant of the plurality of coolants passing therethrough;

a battery pack configured to be mounted on the vehicle and including a battery fire suppression nozzle disposed therein, the battery fire suppression nozzle configured to receive the turbulent mixture from the turbulence generator and to discharge the mixture into an interior of the battery pack for fire suppression; and a first branch pipe branched from an outlet pipe of the first pump and connected to the second water tank, and wherein the outlet pipe of the first pump is connected to a fuel cell exhaust water inlet port of the turbulence generator.

2. The fire extinguishing system of claim 1, further comprising a filter disposed, between the first water tank and the first pump, the filter configured to remove impurities from the fuel cell exhaust water before the fuel cell exhaust water is pumped by the first pump.

3. The fire extinguishing system of claim 1, wherein a first flow control valve is disposed between the outlet pipe of the first pump and the first branch pipe, the first flow control valve configured to control a flow direction of the fuel cell exhaust water so that the water flows to a selected one of the turbulence generator and the second water tank.

4. The fire extinguishing system of claim 3, further comprising:

a second flow control valve disposed at an outlet pipe of the second pump, the second flow control valve configured to control a flow direction of the supplemental water, and a controller configured to control operation of the first pump, the second pump, and operation of opening and closing of the first and second flow control valves.

5. The fire extinguishing system of claim 4, wherein the controller is configured to: control the first and second flow control valves to cause the fuel cell exhaust water pumped by the first pump to pass through the second water tank and be supplied to the turbulence generator by the second pump along with the supplemental water; or cause the fuel cell exhaust water and the supplemental water to be separately pumped by the first pump and the second pump to the turbulence generator.

6. The fire extinguishing system of claim 1, wherein the corresponding outlet pipes of the battery coolant tank, the fuel cell stack coolant tank, and the power electronic system coolant tank are combined together and connected to the inlet of the coolant pump; and each of the corresponding outlet pipes includes an opening and closing valve whose operation is controlled by the controller to selectively supply a corresponding coolant of the plurality of coolants.

7. The fire extinguishing system of claim 6, wherein the controller is configured to open the valve of the battery coolant tank, when a battery fire detector detects a fire in the battery pack, so that the battery coolant is supplied to the turbulence generator and the battery pack.

8. The fire extinguishing system of claim 7, wherein the controller is configured to open the valve of the power electronic system coolant tank when a reignition is detected in the battery pack by a temperature sensor, so that the power electronic system coolant is supplied to the turbulence generator and the battery pack.

9. The fire extinguishing system of claim 8, wherein the controller is configured to open the valve of the fuel cell stack coolant tank when a further reignition is detected, so that the fuel cell stack coolant is supplied to the turbulence generator and the battery pack.

10. The fire extinguishing system of claim 6, wherein the controller is further configured to gradually increase an amount of fire extinguishing water filled in the battery pack each time a reignition occurs.

11. The fire extinguishing system of claim 1, further comprising an opening and closing valve disposed between the coolant pump and the turbulence generator, the opening and closing valve being controlled by the controller.

12. The fire extinguishing system of claim 1, further comprising:

a third branch pipe branched from the outlet pipe of the turbulence generator and connected to a tire fire suppression nozzle; and a third flow control valve disposed between the outlet pipe and the third branch pipe and configured to control a flow direction of the fire extinguishing water to either the battery fire suppression nozzle or the tire fire suppression nozzle.

13. The fire extinguishing system of claim 12, further comprising an operation device connected to the controller and configured to be operated by a driver to extinguish a tire fire, wherein the controller controls the third flow control valve based on signals from a tire fire detector and the operation device.

14. The fire extinguishing system of claim 12, wherein the third branch pipe includes a hose connection port configured for detachable connection to a hose to allow use of the fire extinguishing water outside of the vehicle.

15. The fire extinguishing system of claim 1, wherein the battery pack comprises:

a battery module including a plurality of battery cells; and a battery casing configured to enclose and seal the battery module, wherein the battery fire suppression nozzle is disposed in the battery casing to allow the fire extinguishing water to fill the battery casing.

16. The fire extinguishing system of claim 15, wherein a plurality of battery packs are provided in the vehicle;

the outlet pipe of the turbulence generator is branched and connected to each battery pack of the plurality of battery packs; and a fourth flow control valve is disposed at a branching point and controlled by a controller to direct the fire extinguishing water.

17. The fire extinguishing system of claim 16, wherein the controller selectively opens the fourth flow control valve to supply the fire extinguishing water only to at least one battery pack, of the plurality of battery packs, determined to be on fire by a battery fire detector.

18. The fire extinguishing system of claim 1, wherein the controller is configured to gradually increase an amount of the fire extinguishing water filled in the battery pack each time a reignition is detected.

19. The fire extinguishing system of claim 18, wherein the system is configured to increase a ratio of a space filled with the fire extinguishing water relative to a total internal space of the battery pack so that the ratio reaches a predetermined value each time the reignition is detected.

\* \* \* \* \*